United States Patent
Igarashi et al.

(10) Patent No.: US 11,870,497 B2
(45) Date of Patent: Jan. 9, 2024

(54) OPTICAL RECEIVING APPARATUS, OPTICAL TRANSMISSION SYSTEM, OPTICAL TRANSMISSION METHOD AND COMPUTER PROGRAM

(71) Applicant: NIPPON TELEGRAPH AND TELEPHONE CORPORATION, Tokyo (JP)

(72) Inventors: Ryo Igarashi, Musashino (JP); Takuya Kanai, Musashino (JP); Masamichi Fujiwara, Musashino (JP); Junichi Kani, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 83 days.

(21) Appl. No.: 17/623,852

(22) PCT Filed: Jul. 1, 2019

(86) PCT No.: PCT/JP2019/026036
§ 371 (c)(1),
(2) Date: Dec. 29, 2021

(87) PCT Pub. No.: WO2021/001871
PCT Pub. Date: Jan. 7, 2021

(65) Prior Publication Data
US 2022/0368427 A1    Nov. 17, 2022

(51) Int. Cl.
*H04B 10/61*    (2013.01)
*H04J 14/02*    (2006.01)

(52) U.S. Cl.
CPC .............. *H04B 10/61* (2013.01); *H04J 14/02* (2013.01)

(58) Field of Classification Search
CPC .............. H04B 10/61; H04B 10/07955; H04B 10/0779; H04B 10/07957; H04B 10/0799;
(Continued)

(56) References Cited

U.S. PATENT DOCUMENTS 10,742,328 B2 *   8/2020   Wu .................. H04B 10/612
11,283,526 B2 *   3/2022   Zhou ................ H04B 10/612
(Continued)

FOREIGN PATENT DOCUMENTS

JP    2016054343 A  *  4/2016  ........... H04B 10/294

OTHER PUBLICATIONS

Ryo Koma et al., Wide Range Carrier Frequency Offset Estimation Method using Training Symbols with Asymmetric Constellations for Burst-Mode Coherent Reception, OFC2018, Mar. 11, 2018.

*Primary Examiner* — Hibret A Woldekidan
(74) *Attorney, Agent, or Firm* — Harness, Dickey & Pierce, P.L.C.

(57) ABSTRACT

An optical reception device including: a local light transmission unit configured to generate a plurality of local lights having different wavelengths, select a local light having a wavelength that is close to the wavelength of a received optical signal from among the plurality of generated local lights having different wavelengths, and transmit the selected local light to a coherent receiver; a demultiplexing unit configured to demultiplex a received optical signal and transmit the demultiplexed optical signal to the coherent receiver via a first path; and a wavelength detection unit configured to input the optical signal demultiplexed by the demultiplexing unit via a second path, split the input optical signal into different paths according to wavelengths by using a wavelength multiplexer/demultiplexer, and output, to the local light transmission unit, a control signal for causing the local light transmission unit to output a local light having a (Continued)

frequency that corresponds to a path in which the optical signal is included.

11 Claims, 20 Drawing Sheets

(58) Field of Classification Search
CPC ........ H04B 10/63; H04B 10/64; H04B 10/60; H04B 10/572; H04B 10/564; H04B 10/50; H04B 10/40; H04B 10/43; H04J 14/02; H04J 14/03; H04J 14/0307; H04Q 3/00; H04Q 2011/0015; H04Q 2011/0009; H04Q 2011/0016
See application file for complete search history.

(56) References Cited

U.S. PATENT DOCUMENTS

| | | | |
|---|---|---|---|
| 11,652,554 B2* | 5/2023 | Igarashi | H04B 10/671 398/202 |
| 2019/0379453 A1* | 12/2019 | Toda | H04B 10/07955 |
| 2020/0213011 A1* | 7/2020 | Tanaka | H04B 10/0779 |

* cited by examiner

Fig. 6

| FIRST INPUT | SECOND INPUT | OUTPUT |
|---|---|---|
| 0 | 0 | 0 |
| 0 | 1 | 1 |
| 1 | 0 | 0 |
| 1 | 1 | 0 |

OPTICAL RECEIVING APPARATUS, OPTICAL TRANSMISSION SYSTEM, OPTICAL TRANSMISSION METHOD AND COMPUTER PROGRAM

CROSS-REFERENCE TO RELATED APPLICATIONS

This application is a 371 U.S. National Phase of International Application No. PCT/JP2019/026036 filed on Jul. 1, 2019. The entire disclosure of the above application is incorporated herein by reference.

TECHNICAL FIELD

The present invention relates to an optical reception device, an optical transmission system, an optical transmission method, and a computer program.

BACKGROUND ART

Currently, a PON (Passive Optical Network) method that is standardized by the IEEE (Institute of Electrical and Electronics Engineers) and the ITU-T (International Telecommunication Union Telecommunication Standardization Sector) is widely used in optical subscriber systems.

FIG. 16 is a configuration diagram of an optical transmission system 200 in which the PON method is used. As shown in FIG. 10, in the optical transmission system 200 in which the PON method is used, communication is performed between ONUs (Optical Network Units) 1-1 to 1-3, which are a plurality of subscriber devices, and an OLT (Optical Line Terminal) 2, which is a single station building side device. The ONUs 1-1 to 1-3 are connected to the OLT 2 via a transmission path 3. In downstream communication of the PON method, an optical signal transmitted from the OLT 2 is branched into a plurality of paths by an optical splitter 4 and received by the ONUs 1-1 to 1-3. At this time, each of the ONUs 1-1 to 1-3 selects and receives only a signal in a time slot that is allocated to the ONU.

On the other hand, in upstream communication, each of the ONUs 1-1 to 1-3 transmits a signal only in a time slot that is allocated to the ONU to avoid collision with signals transmitted from the other ONUs of the ONUs 1-1 to 1-3. As described above, in the PON method, the same optical fiber is shared by a plurality of subscribers to reduce the cost of equipment, and therefore it is possible to economically provide a high-speed optical access service.

In access networks in which the PON method is used, there are demands for extension of the maximum transmission distance and an increase in the number of branches from the optical splitter 4 in order to reduce the cost of equipment. Extension of the maximum transmission distance is desired because this makes it possible to integrate lines in a wide area into a single station building. Also, an increase in the number of branches from the optical splitter 4 is desired because the number of OLTs 2 and station buildings per line can be reduced if many lines are integrated into a single OLT 2, and an installation cost and an operation cost of equipment can be reduced.

However, if the transmission distance is extended or the number of branches from an optical splitter is increased, optical loss increases. As a result, signal light intensity at the time when a signal is received by a receiver decreases, a signal-to-noise ratio decreases, and a code error rate deteriorates. In addition, extension of the transmission distance causes signal waveform deterioration due to chromatic dispersion, and the code error rate also deteriorates due to the waveform deterioration. Therefore, in order to extend the transmission distance or increase the number of branches from an optical splitter, a technology for compensating for a reduction in the signal-to-noise ratio and waveform deterioration in the receiver is important.

In order to improve the reduced signal-to-noise ratio, it is possible to consider a method of providing an optical amplifier in a stage preceding an optical receiver to amplify an optical signal. However, there is a problem in that an improvement in reception sensitivity that can be achieved with this method is only about 10 dB because amplified spontaneous emission (ASE) noise is generated when the optical signal is amplified. In contrast, if a method of providing an optical amplifier at an intermediate position of a transmission path is adopted, influence of the ASE noise can be suppressed to be relatively small. However, in this method, relay equipment needs to be newly installed at the intermediate position of the transmission path, and there is a problem in that the cost increases.

Also, it is possible to consider a method of inserting an optical fiber for compensation at an intermediate position of a transmission path in order to compensate for waveform deterioration. However, a distance between a subscriber device that transmits a signal and station building equipment varies according to each subscriber, and characteristics required for the compensation fiber also vary according to the distance, and therefore there is a problem in that the cost increases in this method as well.

In order to solve the problems described above, introducing a digital coherent method into an optical access network is considered. In a conventional intensity modulation-direct detection (IM-DD) method, the signal-to-noise ratio is reduced by thermal noise in the receiver. In contrast, in the digital coherent method, thermal noise generated in the receiver is reduced as a result of coherent reception being performed, and a signal can be received with a signal-to-noise ratio that is close to a shot noise limit. Also, in the digital coherent method, it is possible to compensate for waveform deterioration occurred due to propagation by performing digital signal processing on the received signal.

A reception side device in the digital coherent method performs coherent reception in which phase components of a transmitted optical signal are detected by measuring intensity of a waveform of interference between the optical signal and a local oscillation light (hereinafter referred to as a "local light"). In a signal received through the coherent reception, a frequency offset component that increases in proportion to a difference between the frequency of the optical signal and the frequency of the local light is superimposed on a modulated component of the transmitted signal. Therefore, in order to reproduce the modulated component of the optical signal on the reception side, the frequency offset component needs to be removed from the received signal.

A method described in NPL 1 is an example of methods that have the largest compensation range among methods that have been proposed so far to remove the frequency offset. In the method described in NPL 1, an estimated range of frequency offsets that can be compensated for is $-B/2 \leq fIF < B/2$ (B represents a baud rate). For example, in a system where the baud rate is 10 GHz, the range of frequency offsets that can be estimated is 10 GHz ($-5 \leq fIF < 5$). In this case, it is necessary to match the frequency of the optical signal and the frequency of the local light with high accuracy so that a difference therebetween is no greater than 10 GHz. Therefore, the frequency of the optical signal and the frequency of the local light are usually matched with high accuracy by using a wavelength locker.

CITATION LIST

Non Patent Literature

[NPL 1] R. Koma et al., "Wide Range Carrier Frequency Offset Estimation Method using Training Symbols with Asymmetric Constellations for Burst-Mode Coherent Reception", M3B.5, OFC2018 OSA 2018.

SUMMARY OF THE INVENTION

Technical Problem

In an optical access NW, an OLT is shared by a plurality of users, and therefore, even if the cost of the OLT is increased to a certain extent, the increase only has a small influence on a unit device cost per user. On the other hand, at least one ONU is necessary for each user, and therefore an increase in the cost of the ONU directly leads to an increase in the unit device cost per user. Therefore, it is important to reduce the cost of the ONU in optical access NWs.

In a case where a digital coherent transmission technology is used in upstream communication of an optical access NW, a wavelength locker for stabilizing the wavelength needs to be installed in the ONU, which serves as a transmitter. However, it is difficult to install the costly wavelength locker in the ONU from the standpoint of reducing costs as described above.

As described above, in order to apply the digital coherent transmission technology to upstream communication in an optical access NW at a low cost, it is important to realize a transmitter configuration in which the wavelength locker is unnecessary by increasing the range of frequency variation allowed for the transmitter.

In view of the above circumstances, the present invention has an object of providing a technology that can increase the transmission distance while reducing costs by using a coherent reception method.

Means for Solving the Problem

One aspect of the present invention is an optical reception device including: a local light transmission unit configured to generate a plurality of local lights having different wavelengths, select a local light having a wavelength that is close to the wavelength of a received optical signal from among the plurality of generated local lights having different wavelengths, and transmit the selected local light to a coherent receiver; a demultiplexing unit configured to demultiplex a received optical signal and transmit the demultiplexed optical signal to the coherent receiver via a first path; and a wavelength detection unit configured to input the optical signal demultiplexed by the demultiplexing unit via a second path, split the input optical signal into different paths according to wavelengths by using a wavelength multiplexer/demultiplexer, and output, to the local light transmission unit, a control signal for causing the local light transmission unit to output a local light having a frequency that corresponds to a path in which the optical signal is included.

One aspect of the present invention is the optical reception device described above, wherein the wavelength detection unit detects a path along which the optical signal entered by monitoring optical intensity with respect to each wavelength and comparing the optical intensity with a threshold value, and outputs, to the local light transmission unit, a control signal for causing the local light transmission unit to output a local light having a frequency that is associated with the detected path.

One aspect of the present invention is the optical reception device described above, wherein the wavelength detection unit includes a logic circuit for determining one path from adjacent paths if an optical signal is detected for each of the adjacent paths, and the logic circuit includes a plurality of input units and an output unit and outputs a signal for causing the local light to be output if a first signal and a second signal are input to the plurality of input units, the first signal indicating that the optical intensity is lower than the threshold value, the second signal indicating that the optical intensity is at least the threshold value.

One aspect of the present invention is the optical reception device described above, wherein a wavelength range of receivable signal lights of each local light generated by the local light transmission unit includes a pass range of any one of the paths of the wavelength multiplexer/demultiplexer in the wavelength detection unit, and the local lights and the paths in the wavelength detection unit are associated with each other in one-to-one correspondence.

One aspect of the present invention is the optical reception device described above, wherein, in a method in which a signal light cannot be received if a frequency offset is 0, with respect to the local lights and wavelength arrangement of the wavelength multiplexer/demultiplexer, a band $\beta$ is set such that $\alpha/\beta$ is an integer, $\alpha$ representing a band from a local light to a signal reception band, $\beta$ representing the signal reception band.

One aspect of the present invention is an optical transmission system including: an optical transmitter configured to transmit an optical signal; and an optical reception device configured to receive an optical signal transmitted from the optical transmitter, wherein the optical reception device includes: a local light transmission unit configured to generate a plurality of local lights having different wavelengths, select a local light having a wavelength that is close to the wavelength of a received optical signal from among the plurality of generated local lights having different wavelengths, and transmit the selected local light to a coherent receiver; a demultiplexing unit configured to demultiplex a received optical signal and transmit the demultiplexed optical signal to the coherent receiver via a first path; and a wavelength detection unit configured to input the optical signal demultiplexed by the demultiplexing unit via a second path, split the input optical signal into different paths according to wavelengths by using a wavelength multiplexer/demultiplexer, and output, to the local light transmission unit, a control signal for causing the local light transmission unit to output a local light having a frequency that corresponds to a path in which the optical signal is included.

One aspect of the present invention is an optical transmission method including: a local light transmission step of generating a plurality of local lights having different wavelengths, selecting a local light having a wavelength that is close to the wavelength of a received optical signal from among the plurality of generated local lights having different wavelengths, and transmitting the selected local light to a coherent receiver; a demultiplexing step of demultiplexing a received optical signal and transmitting the demultiplexed optical signal to the coherent receiver via a first path; and a transmission step of inputting the optical signal demultiplexed in the demultiplexing step via a second path, splitting the input optical signal into different paths according to wavelengths by using a wavelength multiplexer/demultiplexer, and causing a local light to be transmitted in the local light transmission step, the local light having a frequency that corresponds to a path in which the optical signal is included.

One aspect of the present invention is a computer program for causing a computer to execute: a local light transmission step of generating a plurality of local lights having different wavelengths, selecting a local light having a wavelength that is close to the wavelength of a received optical signal from among the plurality of generated local lights having different wavelengths, and transmitting the selected local light to a coherent receiver; a demultiplexing step of demultiplexing a received optical signal and transmitting the demultiplexed optical signal to the coherent receiver via a first path; and a transmission step of inputting the optical signal demultiplexed in the demultiplexing step via a second path, splitting the input optical signal into different paths according to wavelengths by using a wavelength multiplexer/demultiplexer, and causing a local light to be transmitted in the local light transmission step, the local light having a frequency that corresponds to a path in which the optical signal is included.

Effects of the Invention

According to the present invention, it is possible to increase the transmission distance while reducing costs by using a coherent reception method.

BRIEF DESCRIPTION OF DRAWINGS

FIG. 6 is a diagram showing an example of a truth table in the first embodiment.

DESCRIPTION OF EMBODIMENTS

The following describes an embodiment of the present invention with reference to the drawings.

First Embodiment

Figure 1:
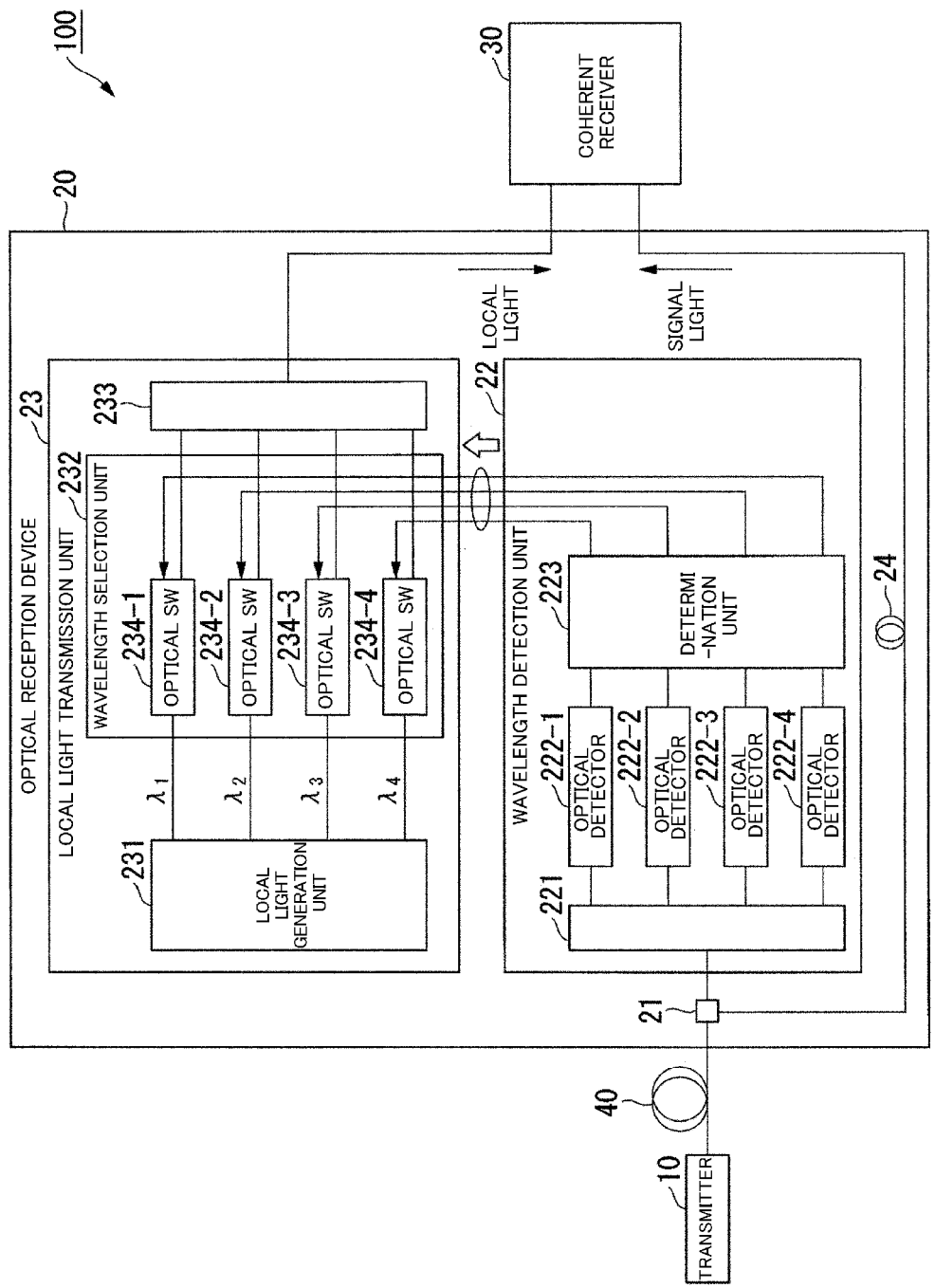
FIG. 1 is a system configuration diagram showing a system configuration of an optical transmission system according to a first embodiment.
Figure 16:
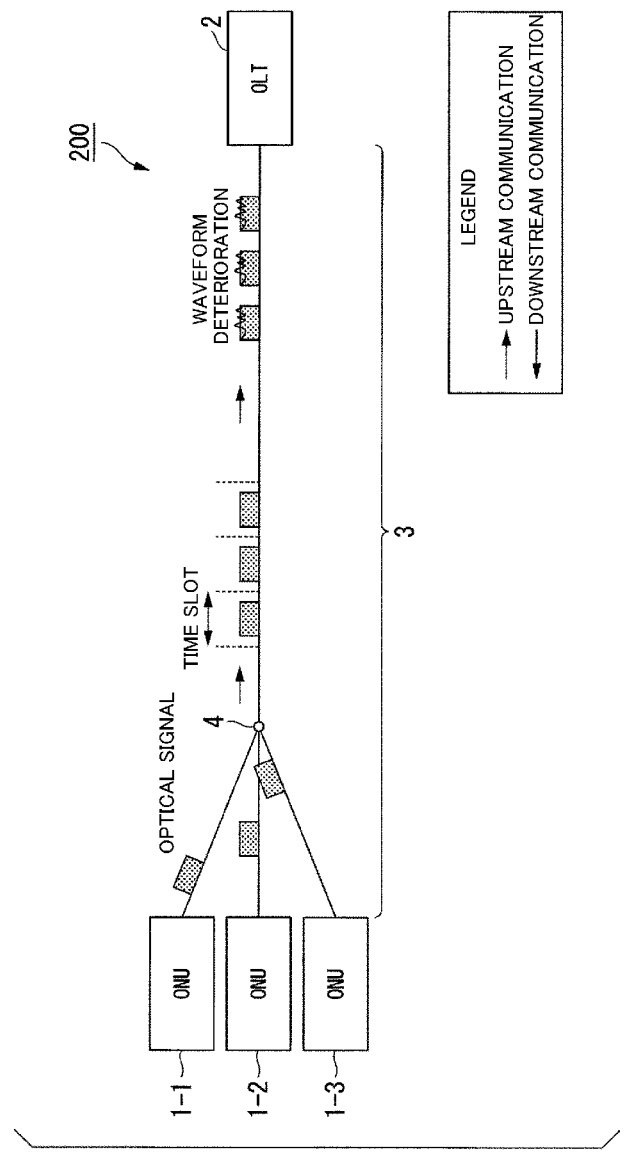
FIG. 16 is a configuration diagram of a conventional optical transmission system in which a PON method is used.

FIG. 1 is a system configuration diagram showing a system configuration of an optical transmission system 100 according to a first embodiment. The optical transmission system 100 includes a transmitter 10, an optical reception device 20, and a coherent receiver 30. The transmitter 10 is included in, for example, each of the ONUs 1-1 to 1-3 in the optical transmission system 200 shown in FIG. 16 in which the PON method is used, and the coherent receiver 30 is included in the OLT 2. The transmitter 10 and the coherent receiver 30 are communicably connected to each other via a transmission path 40. The transmission path 40 transmits an optical signal transmitted from the transmitter 10 to the coherent receiver 30 via the optical reception device 20. The transmission path 40 is an optical fiber, for example.

Figure 2:
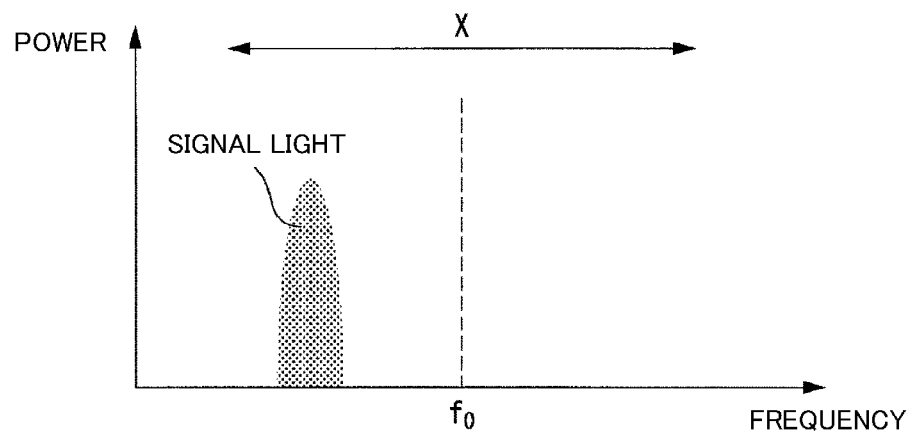
FIG. 2 is a diagram showing an example of an optical signal transmitted by a transmitter in the first embodiment.

The transmitter 10 transmits an optical signal to the transmission path 40. The optical signal transmitted from the transmitter 10 is transmitted through the transmission path 40, branched by an optical splitter, and then input to the coherent receiver 30. Here, assume that the range of wavelength variation of optical signals transmitted from the transmitter 10 is X as shown in FIG. 2.

The optical reception device 20 increases allowable wavelength variation of an optical signal to be greater than or equal to a range of frequency offsets that are allowed by the coherent receiver 30 in a reception method in which an interference signal obtained through superposition of a signal light and a local light is used. In the first embodiment, a case will be described as an example in which intradyne coherent detection is used in the coherent receiver 30 as the reception method in which an interference signal obtained through superposition of a signal light and a local light is used.

Assume that the optical reception device 20 can appropriately decode a signal by compensating for a frequency offset by using a frequency offset compensation technology such as that described in NPL 1 if the frequency of an optical signal input to the coherent receiver 30 is within a range of ±A relative to a local light. The optical reception device 20 is disposed between the transmitter 10 and the coherent receiver 30.

The coherent receiver 30 receives a signal through intradyne coherent detection based on an optical signal and a local light that are input. The coherent receiver 30 processes the received optical signal.

Next, a specific configuration of the optical reception device 20 will be described.

The optical reception device 20 includes an optical splitter 21, a wavelength detection unit 22, a local light transmission unit 23, and a delay fiber 24.

The optical splitter 21 (demultiplexing unit) is a passive optical device that demultiplexes or multiplexes an optical signal. The optical splitter 21 demultiplexes an optical signal that is input to the optical reception device 20 into a first path and a second path. The optical signal is output to the wavelength detection unit 22 via the first path and is output to the delay fiber 24 via the second path. A coupler may also be used instead of the optical splitter 21.

The wavelength detection unit 22 is constituted by a wavelength multiplexer/demultiplexer 221, a plurality of optical detectors 222-1 to 222-4, and a determination unit 223.

The wavelength multiplexer/demultiplexer 221 splits an input optical signal into a plurality of ports according to wavelengths by using an optical filter that has periodic pass widths. The wavelength multiplexer/demultiplexer 221 is an AWG (Arrayed Waveguide Grating) or a multilayer optical filter, for example. Here, assume that the wavelength multiplexer/demultiplexer 221 has a characteristic of dividing the range $f_0 \pm X/2$ of wavelength variation of the transmitter 10 into N ports. At this time, the pass width of each port is X/N.

In the following description, it is assumed that the wavelength multiplexer/demultiplexer 221 has a characteristic of dividing the range $f_0 \pm X/2$ of wavelength variation of the transmitter 10 into four (N=4) ports. Note that N=4 is an example, and the wavelength multiplexer/demultiplexer 221 only needs to have a characteristic of dividing the range of wavelength variation of the transmitter 10 into at least two ports. The ports of the wavelength multiplexer/demultiplexer 221 are connected to the optical detectors 222-1 to 222-4, respectively. The frequency increases, i.e., the wavelength decreases in the order of the optical detectors 222-1 to 222-4, for example.

Figure 3:
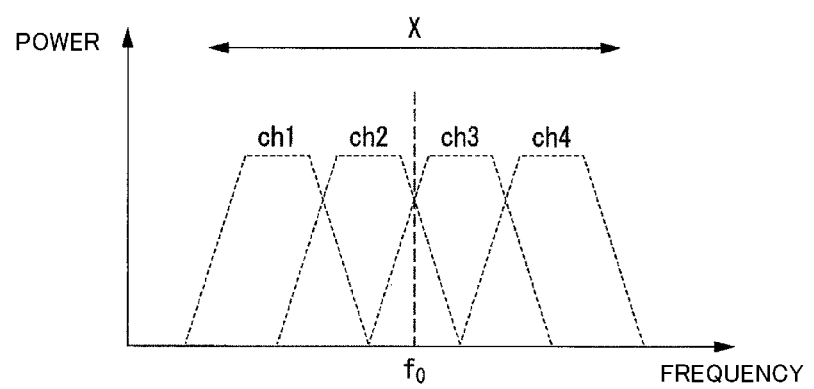
FIG. 3 is a diagram showing an example of passbands of a wavelength multiplexer/demultiplexer in the first embodiment.

FIG. 3 is a diagram showing an example of passbands of the wavelength multiplexer/demultiplexer in the first embodiment. In FIG. 3, the horizontal axis indicates the frequency and the vertical axis indicates power. When the passbands of the wavelength multiplexer/demultiplexer 221 are denoted by ch1 to ch4 in ascending order of frequency, a signal in a frequency band denoted by ch1 is input via a port to the optical detector 222-1, a signal in a frequency band denoted by ch2 is input via a port to the optical detector 222-2, a signal in a frequency band denoted by ch3 is input via a port to the optical detector 222-3, and a signal in a frequency band denoted by ch4 is input via a port to the optical detector 222-4.

When the passbands of the wavelength multiplexer/demultiplexer 221 are denoted by ch1 to ch4 in ascending order of frequency, a signal in a frequency band denoted by ch1 is input via a port to the optical detector 222-1, a signal in a frequency band denoted by ch2 is input via a port to the optical detector 222-2, a signal in a frequency band denoted by ch3 is input via a port to the optical detector 222-3, and a signal in a frequency band denoted by ch4 is input via a port to the optical detector 222-4.

The optical detectors 222-1 to 222-4 are optical detectors that include photodiodes. The optical detectors 222-1 to 222-4 each detect the wavelength of an input optical signal. That is, the optical detectors 222-1 to 222-4 each detect the wavelength of an optical signal by monitoring intensity of the optical signal.

The determination unit 223 determines a target that is to be caused to output a local light, based on results of detection performed by the optical detectors 222-1 to 222-4. The optical detectors 222-1 to 222-4 are respectively provided for different wavelengths. Accordingly, the determination unit 223 determines a target that outputs a local light having a frequency that is the closest to an optical signal, as the target that is to be caused to output the local light, based on the detection results.

As described above, the wavelength detection unit 22 inputs an optical signal via the second path, splits the input optical signal into different paths according to wavelengths by using the wavelength multiplexer/demultiplexer 221, and outputs, to the local light transmission unit 23, a control signal for causing the local light transmission unit 23 to output a local light having a frequency that corresponds to a path in which the optical signal is included, the optical signal having been demultiplexed by the optical splitter 21 that demultiplexes a received optical signal and transmits the demultiplexed optical signal to the coherent receiver 30 via the first path.

The local light transmission unit 23 includes a local light generation unit 231, a wavelength selection unit 232, and a wavelength multiplexer/demultiplexer 233.

Figure 4:
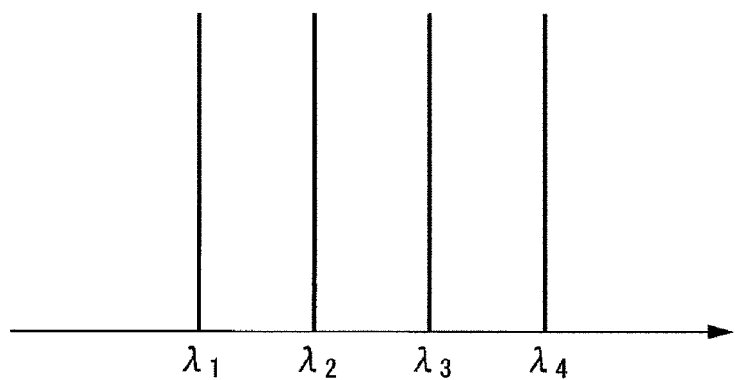
FIG. 4 is a diagram showing an example of local lights generated by a local light generation unit in the first embodiment.

The local light generation unit 231 generates local lights at constant wavelength intervals (e.g., $\lambda_1$, $\lambda_2$, $\lambda_3$, and $\lambda_4$) as shown in FIG. 4, and outputs the generated local lights from a plurality of paths. Here, the local light generation unit 231 is realized by, for example, generating a plurality of continuous lights from an array of a plurality of LDs (Laser Diodes) or a single LD using a modulator and branching the continuous lights by using a wavelength multiplexer/demultiplexer. Note that the following describes a configuration in which the local light generation unit 231 generates four local lights having different wavelengths, but the local light generation unit 231 only needs to generate at least two local lights having different wavelengths.

The wavelength selection unit 232 selects a local light having a wavelength that is the closest to the wavelength of an optical signal. The wavelength selection unit 232 transmits the selected local light via the wavelength multiplexer/demultiplexer 233 to the coherent receiver 30. The wavelength selection unit 232 is constituted by a plurality of optical SWs 234-1 to 234-4.

The optical SWs 234-1 to 234-4 are devices that perform control to pass or not to pass the local lights output from the local light generation unit 231. The optical SWs 234-1 to 234-4 perform control to pass or not to pass the input local lights based on control signals that are output from the wavelength detection unit 22. For example, if a control signal output from the wavelength detection unit 22 is an ON signal that indicates passing a local light, any of the optical SWs 234-1 to 234-4 to which the ON signal is input passes a local light. On the other hand, if a control signal output from the wavelength detection unit 22 is an OFF signal that indicates not passing a local light, any of the optical SWs 234-1 to 234-4 to which the OFF signal is input interrupts a local light.

The wavelength multiplexer/demultiplexer 233 multiplexes a local light output from any of the optical SWs 234-1 to 234-4 and outputs the multiplexed local light to the coherent receiver 30.

As described above, the local light transmission unit 23 generates a plurality of local lights having different wavelengths (e.g., $\lambda_1$, $\lambda_2$, $\lambda_3$, and $\lambda_4$), selects a local light having a wavelength that is close to the wavelength of a received optical signal from among the generated local lights having different wavelengths, and transmits the selected local light to the coherent receiver 30.

Figure 5:
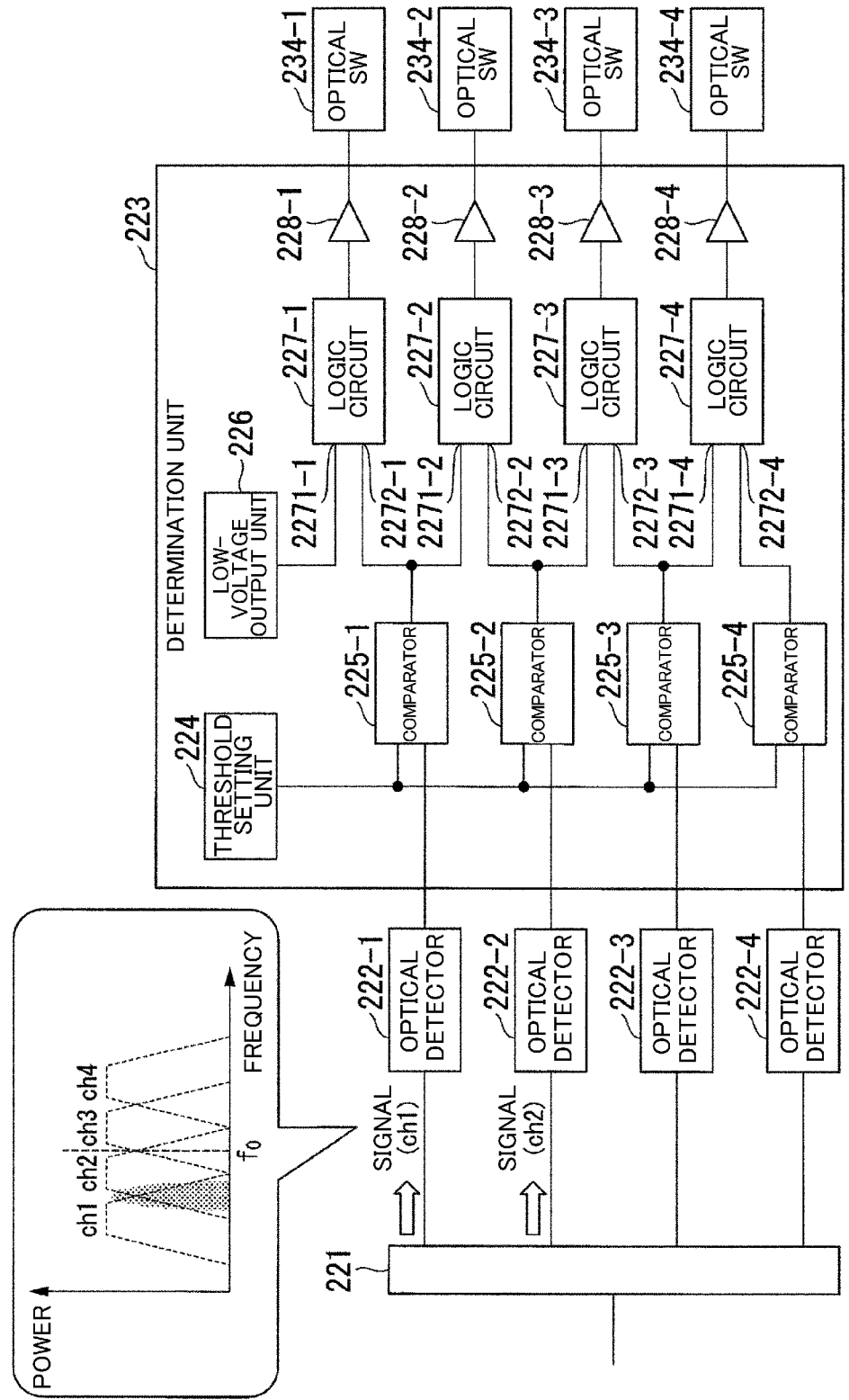
FIG. 5 is a diagram showing an internal configuration of a determination unit in the first embodiment.

FIG. 5 is a diagram showing an internal configuration of the determination unit 223 in the first embodiment.

The determination unit 223 is constituted by a threshold setting unit 224, a plurality of comparators 225-1 to 225-4, a low-voltage output unit 226, a plurality of logic circuits 227-1 to 227-4, and a plurality of voltage adjusters 228-1 to 228-4.

The threshold setting unit 224 sets, in the comparators 225-1 to 225-4, a threshold value that is to be compared with values that are input to the comparators 225-1 to 225-4. The threshold value only needs to be a value based on which it can be determined that an optical signal has been detected. Although a configuration in which the threshold setting unit 224 sets the same threshold value in the comparators 225-1 to 225-4 is shown, the threshold setting unit 224 may also set different threshold values for the comparators 225-1 to 225-4. In this case, the threshold setting unit 224 may also be provided for each of the comparators 225-1 to 225-4.

The comparators 225-1 to 225-4 compare detection results of the optical detectors 222-1 to 222-4 with the threshold value set by the threshold setting unit 224, and output comparison results to the logic circuits 227. Specifically, the comparators 225-1 to 225-4 each determine that an optical signal has been detected if a detection result is greater than or equal to the threshold value. If an optical signal has been detected, the comparators 225-1 to 225-4 each generate a HIGH(1) signal and output the HIGH(1) signal to the logic circuits 227-1 to 227-4. On the other hand, the comparators 225-1 to 225-4 each determine that an optical signal has not been detected if a detection result is smaller than the threshold value. If an optical signal has not been detected, the comparators 225-1 to 225-4 each generate a LOW(0) signal and output the LOW(0) signal to the logic circuits 227-1 to 227-4.

The low-voltage output unit 226 outputs a LOW(0) signal.

Each of the logic circuits 227-1 to 227-4 is a circuit with two inputs and one output. The logic circuits 227-1 to 227-4 include first input units 2271-1 to 2271-4 and second input units 2272-1 to 2272-4 as input units. The logic circuits 227-1 to 227-4 output results based on a truth table shown in FIG. 6.

FIG. 6 is a diagram showing an example of the truth table in the first embodiment. In the truth table shown in FIG. 6, first input corresponds to input to the first input units 2271-1 to 2271-4 and second input corresponds to input to the second input units 2272-1 to 2272-4. Here, operations of the logic circuits 227-1 to 227-4 will be described. The logic circuits 227-1 to 227-4 each output a LOW(0) signal to a corresponding one of the voltage adjusters 228-1 to 228-4 if a LOW(0) signal is input from a corresponding one of the first input units 2271-1 to 2271-4 and a LOW(0) signal is input from a corresponding one of the second input units 2272-1 to 2272-4.

The logic circuits 227-1 to 227-4 each output a HIGH(1) signal to a corresponding one of the voltage adjusters 228-1 to 228-4 if a LOW(0) signal is input from a corresponding one of the first input units 2271-1 to 2271-4 and a HIGH(1) signal is input from a corresponding one of the second input units 2272-1 to 2272-4. The HIGH(1) signal output from the logic circuits 227-1 to 227-4 is a signal for causing the optical SWs 234-1 to 234-4 to enter a passage state. That is, the HIGH(1) signal output from the logic circuits 227-1 to 227-4 is a signal for causing a local light to be output to the coherent receiver 30.

The logic circuits 227-1 to 227-4 each output a LOW(0) signal to a corresponding one of the voltage adjusters 228-1 to 228-4 if a HIGH(1) signal is input from a corresponding one of the first input units 2271-1 to 2271-4 and a LOW(0) signal is input from a corresponding one of the second input units 2272-1 to 2272-4. The LOW(0) signal output from the logic circuits 227-1 to 227-4 is a signal for causing the optical SWs 234-1 to 234-4 to enter an interrupting state. That is, the LOW(0) signal output from the logic circuits 227-1 to 227-4 is a signal for keeping a local light from being output to the coherent receiver 30.

The logic circuits 227-1 to 227-4 each output a LOW(0) signal to a corresponding one of the voltage adjusters 228-1 to 228-4 if a HIGH(1) signal is input from a corresponding one of the first input units 2271-1 to 2271-4 and a HIGH(1) signal is input from a corresponding one of the second input units 2272-1 to 2272-4.

As described above, each of the logic circuits 227-1 to 227-4 is a logic circuit that outputs a HIGH(1) signal only when a LOW(0) signal is input from a corresponding one of the first input units 2271-1 to 2271-4 and a HIGH(1) signal is input from a corresponding one of the second input units 2272-1 to 2272-4.

The comparators 225-1 to 225-4 and the logic circuits 227-1 to 227-4 may also be implemented by a combination of processing performed in a computer such as a FPGA (Field Programmable Gate Array) or an ASIC (Application Specific Integrated Circuit) and analog circuits.

The voltage adjusters 228-1 to 228-4 generate control signals (electrical signals) for controlling the optical SWs 234-1 to 234-4 based on signals output from the logic circuits 227-1 to 227-4. If a signal output from a corresponding one of the logic circuits 227-1 to 227-4 is a HIGH(1) signal, the voltage adjusters 228-1 to 228-4 each generate a control signal for causing a corresponding one of the optical SWs 234-1 to 234-4 to enter the passage state and output the generated control signal to the corresponding one of the optical SWs 234-1 to 234-4. If a signal output from a corresponding one of the logic circuits 227-1 to 227-4 is a LOW(0) signal, the voltage adjusters 228-1 to 228-4 each generate a control signal for causing a corresponding one of the optical SWs 234-1 to 234-4 to enter the interrupting state and output the generated control signal to the corresponding one of the optical SWs 234-1 to 234-4.

In a case where the wavelength of an optical signal is in a region where passbands of two adjacent ports of the wavelength multiplexer/demultiplexer 221 in the wavelength detection unit 22 overlap, if the optical signal has been detected for both of the ports and the determination unit 223 determines that the optical signal has been detected for the two ports, two optical SWs in the wavelength selection unit 232 may enter the passage state and two local lights may enter the coherent receiver 30. However, in this case, the signal cannot be appropriately decoded. Therefore, if an optical signal is detected for two adjacent ports, the determination unit 223 needs to transmit a control signal for causing an optical SW to enter the passage state only to an optical SW that corresponds to either one of the ports. The optical reception device 20 includes the comparators 225-1 to 225-4 and the logic circuits 227-1 to 227-4 to determine only one of two ports in the determination unit 223 even if an optical signal is detected for the two ports.

The description of the configuration of the optical reception device 20 will be continued again referring to FIG. 1. The delay fiber 24 is a delay line for delaying input of the optical signal to the coherent receiver 30. The delay fiber 24 is preferably long enough to secure time until a local light, which is an output result from the local light transmission unit 23, is input to the coherent receiver 30. In the processing performed in the determination unit and the wavelength selection unit, a delay may occur from when the wavelength detection unit 22 detects the wavelength of the signal until when a suitable local light is transmitted to the coherent receiver 30. In this case, a leading portion of the optical signal arrived at the coherent receiver 30 cannot be decoded. The delay fiber 24 is provided immediately before multiplexing of the local light to avoid this problem.

Next, a specific method for selecting a local light having a frequency that is the closest to the optical signal out of local lights generated by the local light generation unit 231 will be described.

In the wavelength selection unit 232, local lights that are input are separated into a plurality of ports according to wavelengths by using a wavelength multiplexer/demultiplexer such as an AWG or a multilayer optical filter. The optical SWs 234-1 to 234-4 are respectively provided on the ports of the wavelength multiplexer/demultiplexer, and the local lights are again multiplexed by the wavelength multiplexer/demultiplexer 233 disposed in a following stage. Here, the optical SWs 234-1 to 234-4 are devices that perform control to output or not to output the input local lights based on electrical signals applied from the outside as described above. Thus, the coherent receiver 30 causes only an optical SW out of the optical SWs 234-1 to 234-4 that is connected to a port from which a suitable local light is output to enter the passage state based on an electrical signal applied from the outside and causes the other optical SWs to enter the interrupting state, to output only the suitable local light out of the plurality of local lights generated by the local light generation unit 231 to the coherent receiver 30.

Next, the following describes a flow up to transmission of control signals from the determination unit 223 to the local light transmission unit 23.

As described above, an optical signal is initially branched by the optical splitter 21 and is input to the wavelength detection unit 22 and the coherent receiver 30. In the wavelength detection unit 22, the optical signal is split into a plurality of ports according to wavelengths by the wavelength multiplexer/demultiplexer 221. Here, a case will be described as an example in which the optical signal is split into four ports by the wavelength multiplexer/demultiplexer. The optical signal is output to a specific port of the wavelength multiplexer/demultiplexer 221 according to the wavelength. Lights that entered respective ports of the wavelength multiplexer/demultiplexer 221 are converted to electrical signals by the optical detectors 222-1 to 222-4 disposed in a following stage. Thereafter, determination is performed using the threshold value in the determination unit 223 to detect the port where the optical signal entered.

The determination unit 223 monitors intensity of an optical signal in each port and determines an optical SW that is to be caused to enter the passage state out of the optical SWs 234-1 to 234-4 in the wavelength selection unit 232. Then, the determination unit 223 transmits a control signal to the determined optical SW out of the optical SWs 234-1 to 234-4. The determination unit 223 needs to associate, in advance, a suitable port in the wavelength detection unit 22 with an optical SW out of the optical SWs 234-1 to 234-4 in the wavelength selection unit 232, to which the control signal is to be transmitted when an optical signal is detected for the port. To do this, the passband of a single port in the wavelength detection unit 22 needs to be covered by a receivable band of a single local light output from the local light transmission unit 23.

Figure 7A:
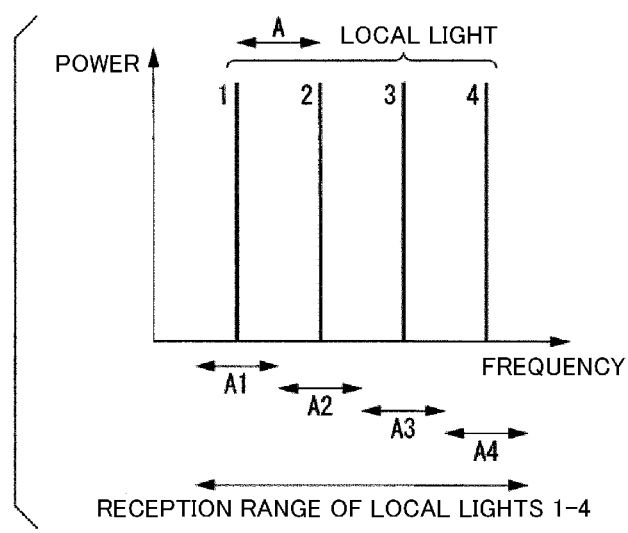
FIG. 7A is a diagram showing frequency ranges of optical signals that can be received using respective local lights in the first embodiment.
Figure 7B:
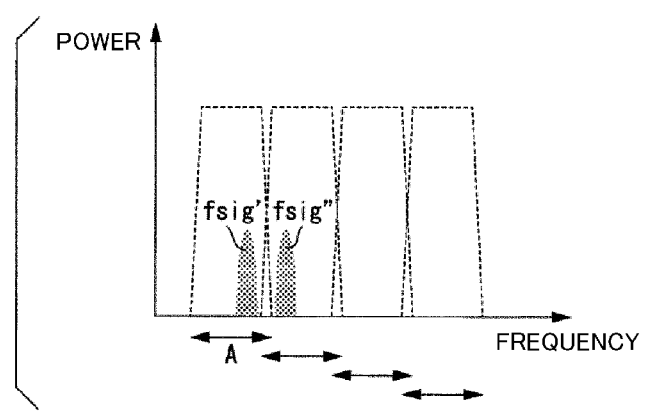
FIG. 7B is a diagram showing passbands of a wavelength multiplexer/demultiplexer 221 in a wavelength detection unit in a case where the local lights shown in FIG. 7A are used and there is one-to-one correspondence between the pass width of a single port of the wavelength multiplexer/demultiplexer and a signal reception range of a local light in a wavelength selection unit.

FIG. 7A is a diagram showing frequency ranges of optical signals that can be received using respective local lights. In FIG. 7A, frequency intervals between the local lights are set to A to maximize the frequency ranges of optical signals that can be received using the respective local lights. FIG. 7B is a diagram showing passbands of the wavelength multiplexer/demultiplexer 221 in the wavelength detection unit 22 in a case where the local lights shown in FIG. 7A are used and there is one-to-one correspondence between the pass width of a single port of the wavelength multiplexer/demultiplexer and a signal reception range of a single local light in the wavelength selection unit 232. A case where the frequency of an optical signal is $f_{sig}'$ or $f_{sig}''$ will be considered using FIG. 7B. Here, local lights having frequencies that are respectively the closest to $f_{sig}'$ and $f_{sig}''$ are local lights 1 and 2, and signals having the frequencies $f_{sig}'$ and $f_{sig}''$ can be correctly received only when the local lights 1 and 2 are selected, respectively. In this case, the optical signals having the frequencies $f_{sig}'$ and $f_{sig}''$ enter different ports in the wavelength detection unit 22, and therefore it is possible to select a suitable local light by distinguishing the optical signals. As described above, a wavelength range of receivable signal lights of each local light generated by the local light transmission unit 23 includes the pass range of any one of the paths of the wavelength multiplexer/demultiplexer 221 in the wavelength detection unit 22, and the local lights and the paths in the wavelength detection unit 22 are associated with each other in one-to-one correspondence.

Figure 7C:
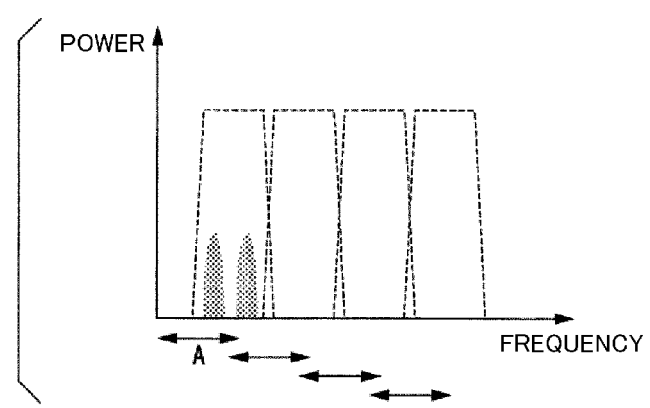
FIG. 7C is a diagram showing wavelength arrangement in a case where the pass width of a single port of the wavelength multiplexer/demultiplexer in the wavelength detection unit of the first embodiment does not have one-to-one correspondence with the signal reception range of a local light in the wavelength selection unit.

FIG. 7C is a diagram showing wavelength arrangement in a case where the pass width of a single port of the wavelength multiplexer/demultiplexer 221 in the wavelength detection unit 22 does not have one-to-one correspondence with the signal reception range of a single local light in the wavelength selection unit 232. In this case, optical signals having the frequencies $f_{sig}'$ and $f_{sig}''$ enter the same port of the wavelength multiplexer/demultiplexer 221 and cannot be distinguished from each other, and therefore a suitable local light cannot be selected for each of the optical signals.

As described above, in order to select a local light that is suitable for the frequency of an optical signal, the pass width of a single port of the wavelength multiplexer/demultiplexer 221 in the wavelength detection unit 22 needs to have one-to-one correspondence with the signal reception range of a single local light in the wavelength selection unit 232.

Figure 8:
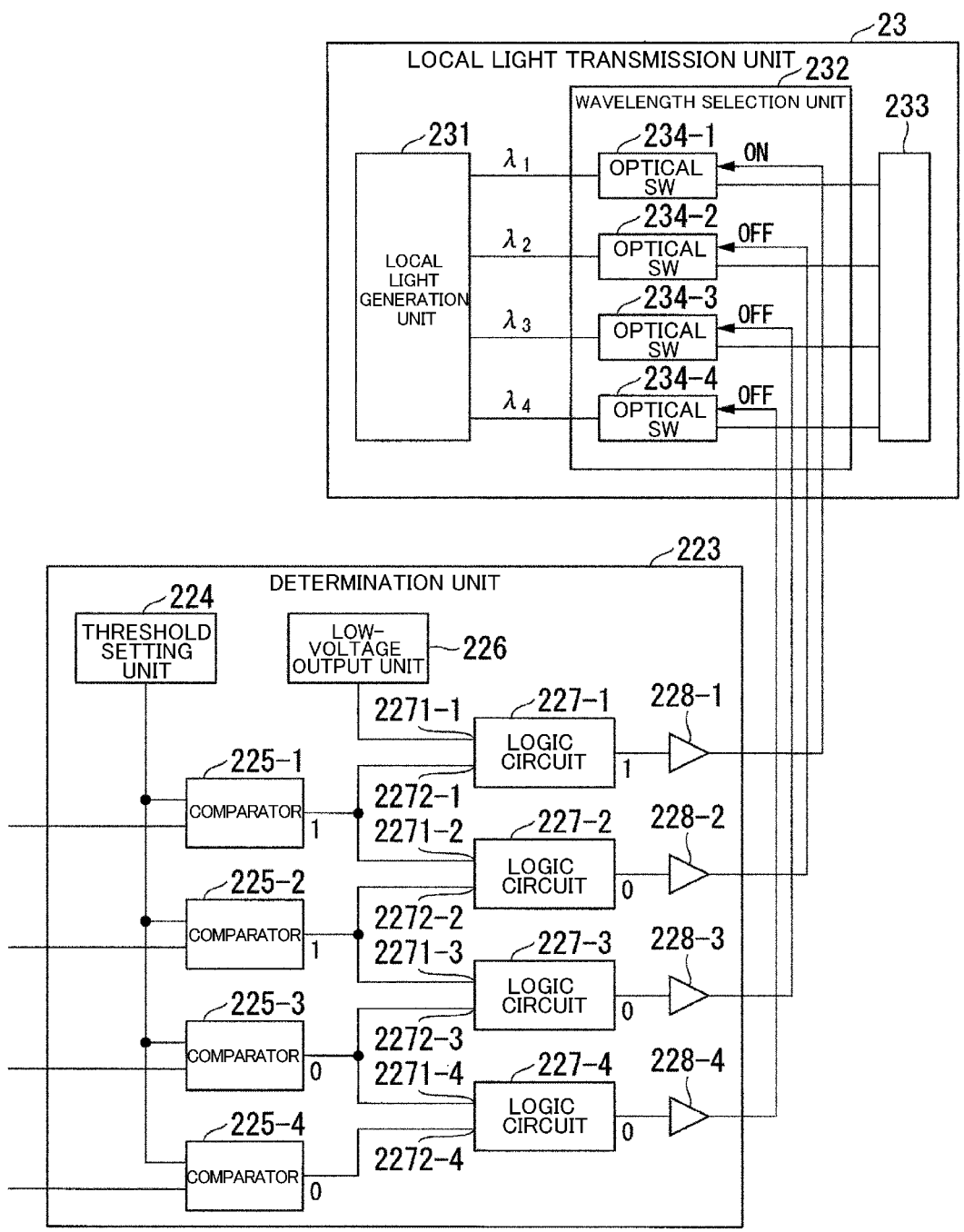
FIG. 8 is a diagram for describing a specific operation example of an optical reception device in the first embodiment.

FIG. 8 is a diagram for describing a specific operation example of the optical reception device 20 in the first embodiment.

Assume that, as shown in FIG. 8, a HIGH(1) signal is output from the comparator 225-1, a HIGH(1) signal is output from the comparator 225-2, a LOW(0) signal is output from the comparator 225-3, and a LOW(0) signal is output from the comparator 225-4 as results of comparison performed by the comparators 225-1 to 225-4.

In this case, the first input unit 2271-1 of the logic circuit 227-1 inputs a LOW(0) signal from the low-voltage output unit 226, and the second input unit 2272-1 inputs the HIGH(1) signal from the comparator 225-1. The logic circuit 227-1 outputs a HIGH(1) signal to the voltage adjuster 228-1 based on the plurality of input signals.

The voltage adjuster 228-1 generates a control signal (ON signal) for causing the optical SW 234-1 to enter the passage state because the signal output from the logic circuit 227-1 is the HIGH(1) signal. The voltage adjuster 228-1 outputs the generated control signal to the optical SW 234-1.

The optical SW 234-1 performs control to pass a local light because the control signal output from the voltage adjuster 228-1 is the ON signal.

The first input unit 2271-2 of the logic circuit 227-2 inputs the HIGH(1) signal from the comparator 225-1, and the second input unit 2272-2 inputs the HIGH(1) signal from the comparator 225-2. The logic circuit 227-2 outputs a LOW(0) signal to the voltage adjuster 228-2 based on the plurality of input signals.

The voltage adjuster 228-2 generates a control signal (OFF signal) for causing the optical SW 234-2 to enter the interrupting state because the signal output from the logic circuit 227-2 is the LOW(0) signal. The voltage adjuster 228-2 outputs the generated control signal to the optical SW 234-2.

The optical SW 234-2 performs control to interrupt a local light because the control signal output from the voltage adjuster 228-2 is the OFF signal.

The first input unit 2271-3 of the logic circuit 227-3 inputs the HIGH(1) signal from the comparator 225-2, and the second input unit 2272-3 inputs the LOW(0) signal from the comparator 225-3. The logic circuit 227-3 outputs a LOW(0) signal to the voltage adjuster 228-3 based on the plurality of input signals.

The voltage adjuster 228-3 generates a control signal (OFF signal) for causing the optical SW 234-3 to enter the interrupting state because the signal output from the logic circuit 227-3 is the LOW(0) signal. The voltage adjuster 228-3 outputs the generated control signal to the optical SW 234-3.

The optical SW 234-3 performs control to interrupt a local light because the control signal output from the voltage adjuster 228-3 is the OFF signal.

The first input unit 2271-4 of the logic circuit 227-4 inputs the LOW(0) signal from the comparator 225-3, and the second input unit 2272-4 inputs the LOW(0) signal from the comparator 225-4. The logic circuit 227-4 outputs a LOW(0) signal to the voltage adjuster 228-4 based on the plurality of input signals.

The voltage adjuster 228-4 generates a control signal (OFF signal) for causing the optical SW 234-4 to enter the interrupting state because the signal output from the logic circuit 227-4 is the LOW(0) signal. The voltage adjuster 228-4 outputs the generated control signal to the optical SW 234-4.

The optical SW 234-4 performs control to interrupt a local light because the control signal output from the voltage adjuster 228-3 is the OFF signal.

As a result of control being performed as shown in FIG. 8, the coherent receiver 30 can output only a suitable local light out of the plurality of local lights generated by the local light generation unit 231 to the coherent receiver 30 by causing only an optical SW out of the optical SWs 234-1 to 234-4 that is connected to a port from which the suitable local light is output to enter the passage state based on an electrical signal applied from the outside and causing the other optical SWs to enter the interrupting state as described above.

Figure 9:
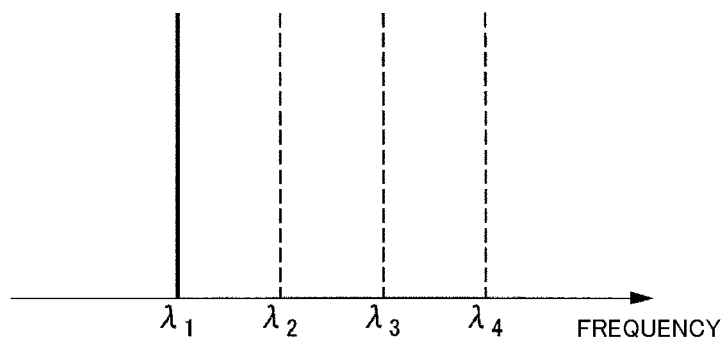
FIG. 9 is a diagram showing an example of a local light transmitted from a local light transmission unit as a result of processing shown in FIG. 8.

FIG. 9 is a diagram showing an example of a local light transmitted from the local light transmission unit 23 as a result of the processing shown in FIG. 8. In FIG. 9, the local lights shown in FIG. 4, which are generated by the local light generation unit 231, are shown as examples. As shown in FIG. 9, only the local light having the wavelength is transmitted from the local light transmission unit 23 as a result of the processing shown in FIG. 8.

Figure 10:
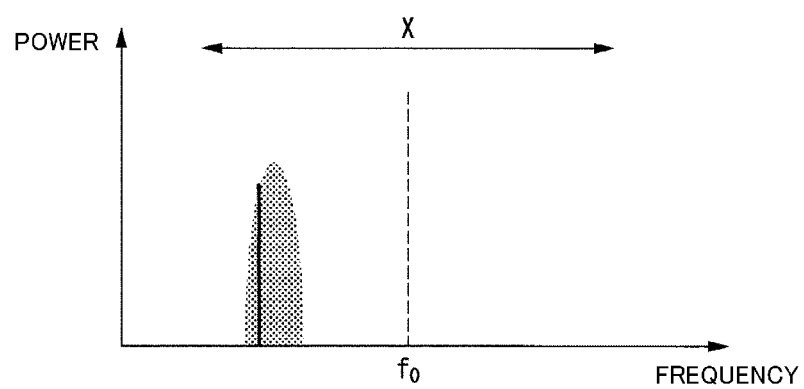
FIG. 10 is a diagram showing an example of an optical signal output from the optical reception device in the first embodiment.

FIG. 10 is a diagram showing an example of an optical signal that is output from the optical reception device 20 in the first embodiment. An optical signal input to the optical reception device 20 is input to the coherent receiver 30 via the delay fiber 24. Accordingly, the optical signal shown in FIG. 10 is input to the coherent receiver 30.

The coherent receiver 30 receives a signal through intradyne coherent detection by using the local light shown in FIG. 9 and the optical signal shown in FIG. 10.

According to the optical transmission system 100 configured as described above, in a stage preceding the coherent receiver 30, an optical signal is split into a plurality of ports by the wavelength multiplexer/demultiplexer 221 such that a band in which the wavelength varies in the transmitter 10 is divided into a plurality of bands, and a local light that has a frequency corresponding to a port where the optical signal entered is transmitted to the coherent receiver 30. With this configuration, even if the wavelength of an optical signal transmitted from the transmitter 10 varies, a local light that is close to the wavelength can be used for amplification, and accordingly, an offset component generated due to a frequency difference can be reduced. Therefore, it is possible to increase the transmission distance while reducing costs when increasing the transmission distance in the coherent reception method.

More specifically, the wavelength selection unit 232 of the optical reception device 20 selects a local light having a wavelength that is the closest to the wavelength of the optical signal and outputs the selected local light to the coherent receiver 30. As described above, the optical reception device 20 detects the wavelength of the optical signal in the wavelength detection unit 22, selects a suitable local light according to the wavelength, and outputs the selected local light to the coherent receiver 30. Therefore, the optical signal can be appropriately received by the coherent receiver 30 even if wavelength variation of the optical signal is greater than a range of frequency offsets that can be compensated for by a DSP (Digital Signal Processor). That is, in the optical transmission system 100, coherent reception is performed by generating a plurality of local lights having different wavelengths and selecting a local light having a frequency that is the closest to the wavelength of the signal to reduce a frequency offset generated in the coherent receiver 30, and consequently, the range of frequency variation allowed for the optical signal can be increased. Therefore, it is possible to increase the transmission distance while reducing costs by using the coherent reception method.

Second Embodiment

In the first embodiment, a method for increasing frequency variation allowed for the transmitter 10 is described based on a premise that an optical signal can be received if the frequency offset is 0 (optical signal can be received if the frequency of a local light matches the frequency of the optical signal). That is, it is assumed that intradyne coherent detection is performed in the coherent receiver 30. On the other hand, in a case where a reception method such as a heterodyne detection method or a KK (Kramers-Kronig) reception method that uses an interference signal obtained through superposition of a signal light and a local light is used in the coherent receiver 30, an optical signal cannot be received if the frequency offset is 0. Therefore, in order to correctly receive the signal, wavelengths need to be set such that the frequency of the optical signal and the frequency of the local light differ from each other to a certain extent. In the second embodiment, a method for increasing frequency variation allowed for the transmitter 10 in a method in which an optical signal cannot be received if the frequency offset is 0 will be described.

Figure 11:
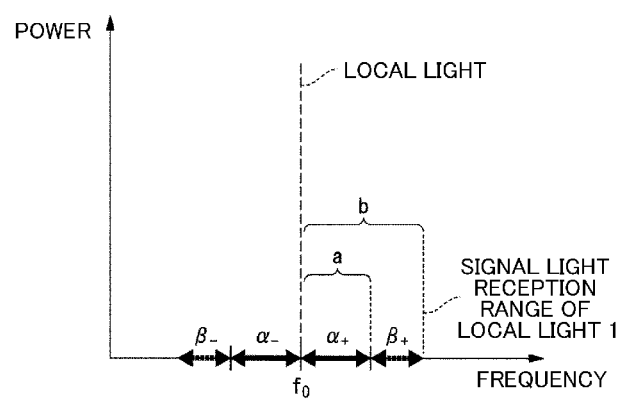
FIG. 11 is an illustrative diagram regarding a local light in a second embodiment.

The basic configuration of the optical transmission system 100 is the same as that in the first embodiment. Here, assume that, as shown in FIG. 11, the frequency of a local light is $f_0$, frequency bands of optical signals that can be received using the local light are $f_0-b$ to $f_0-a$ and $f_0+a$ to $f_0+b$, and these bands are denoted by $\beta_-$ and $\beta_+$, respectively. Further, bands $f_0-a$ to $f_0$ and $f_0$ to $f_0+a$ are denoted by $\alpha_-$ and $\alpha_+$.

Figure 12:
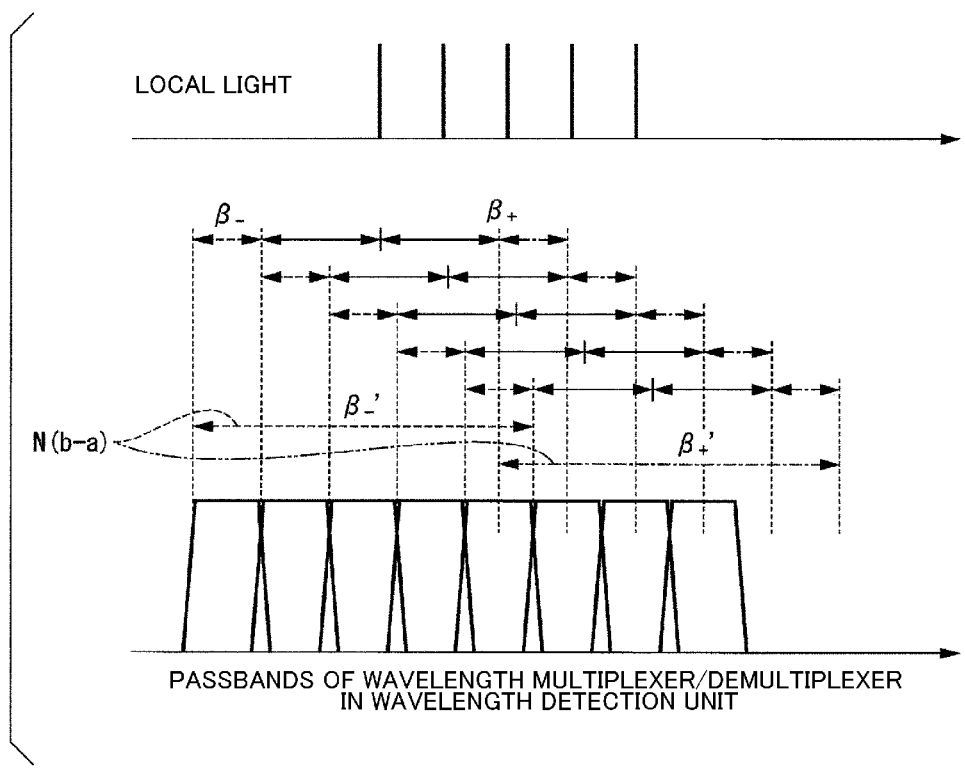
FIG. 12 is a diagram showing an example of a case where bands $\beta_-$ are set so as to match respective ports of the wavelength multiplexer/demultiplexer in the wavelength detection unit.

In order to increase a frequency band allowed for an optical signal in the second embodiment, local lights and wavelength arrangement of the wavelength multiplexer/demultiplexer 221 need to be set such that a band of optical signals that can be received using a single local light covers the band of a single port of the wavelength multiplexer/demultiplexer 221 in the wavelength detection unit 22 as described in the first embodiment. A case where bands ν are set so as to match respective ports of the wavelength multiplexer/demultiplexer 221 in the wavelength detection unit 22 to satisfy this condition will be considered. FIG. 12 shows an example of the case.

FIG. 12 is a diagram showing an example of the case where the bands $\beta_-$ are set so as to match respective ports of the wavelength multiplexer/demultiplexer 221 in the wavelength detection unit 22. However, assume that, in FIG. 12, bands $\beta_+$ do not completely match bands of respective ports of the wavelength multiplexer/demultiplexer 221 in the wavelength detection unit 22. Here, if the number of local lights that are used is N, a sum of the frequency bands $\beta_-$ of optical signals covered by the respective local lights and a sum of the frequency bands $\beta_+$ of optical signals covered by the respective local lights are both N(b−a) and are denoted by $\beta_-'$ and $\beta_+'$, respectively.

Here, in the band $\beta_+'$, the local lights do not have one-to-one correspondence with the ports of the wavelength multiplexer/demultiplexer 221 in the wavelength detection unit 22, and therefore uncertainty arises as described in the first embodiment and a local light that is suitable for an optical signal cannot be appropriately selected. On the other hand, in the band $\beta_-'$, the ports of the wavelength multiplexer/demultiplexer and the local lights can be associated with each other in one-to-one correspondence, and therefore a local light suitable for an optical signal can be appropriately selected. In this case, frequency variation that can be allowed for the transmitter 10 is N(b−a).

Figure 13:
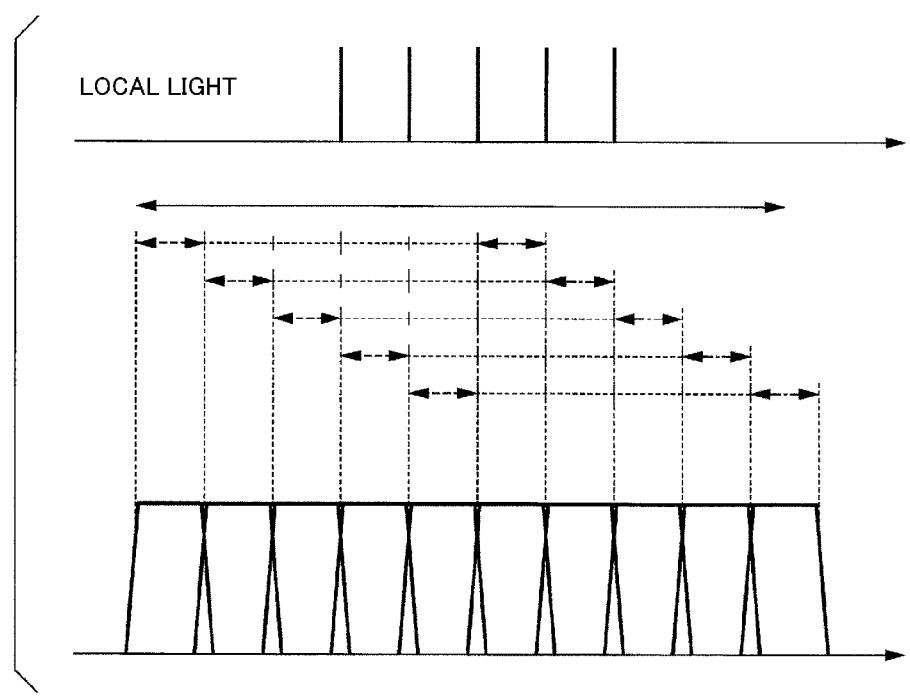
FIG. 13 is a diagram showing an example of a case where wavelengths are arranged such that local lights match respective ports of the wavelength multiplexer/demultiplexer in the wavelength detection unit.
Figure 14A:
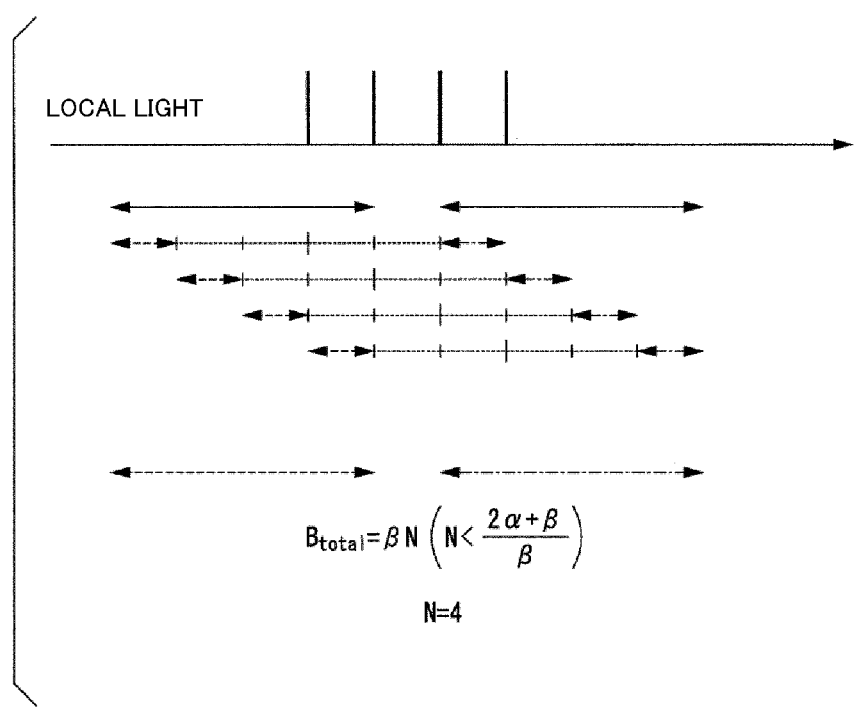
FIG. 14A is a diagram showing an example of a case where $\alpha/\beta=2$ and N is changed to 4.
Figure 14B:
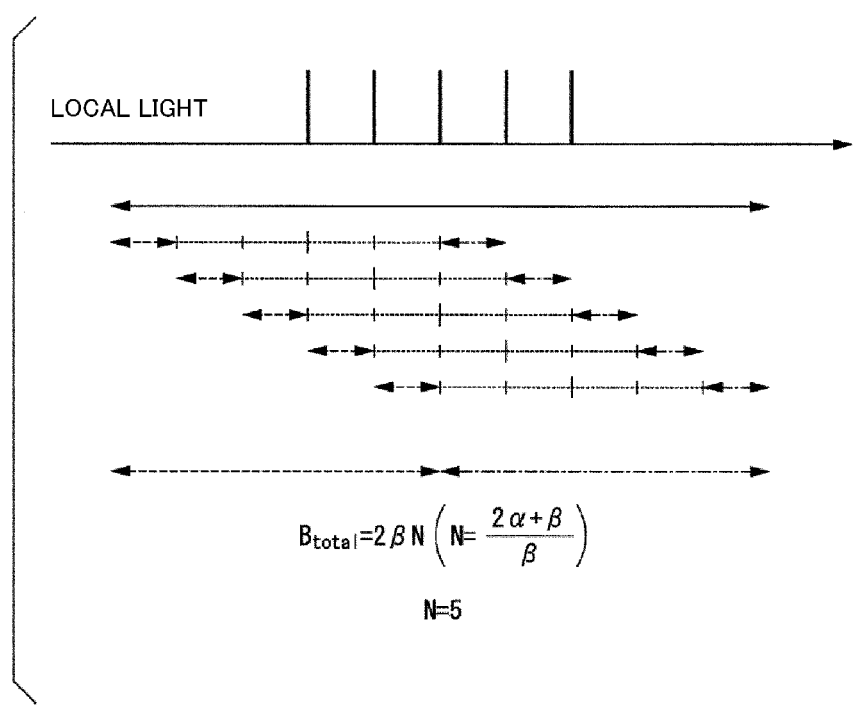
FIG. 14B is a diagram showing an example of a case where $\alpha/\beta=2$ and N is changed to 5.
Figure 14C:
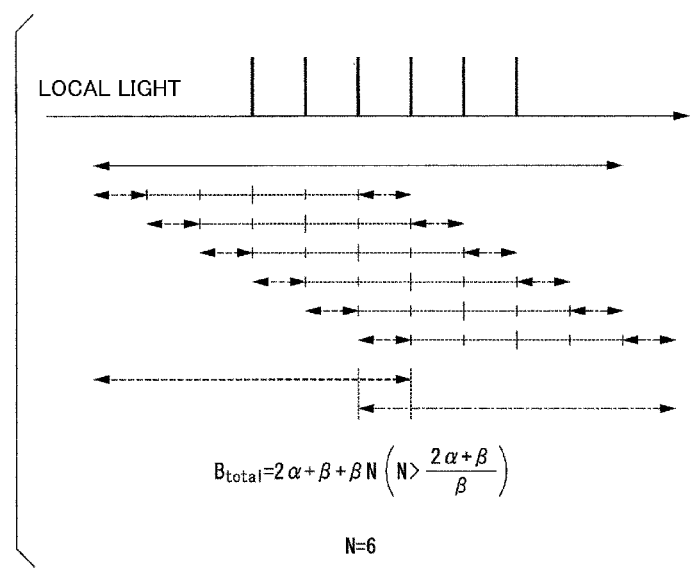
FIG. 14C is a diagram showing an example of a case where $\alpha/\beta=2$ and N is changed to 6.

If wavelengths are arranged such that the local lights match respective ports of the wavelength multiplexer/demultiplexer 221 in the wavelength detection unit 22 not only in the band $\beta_-'$ but also in the band $\beta_+'$ as shown in FIG. 13, it is possible to receive signals in both of the bands $\beta_-'$ and $\beta_+'$. In order to realize this, $\beta$ needs to be set such that a value ($\alpha/\beta$) obtained by dividing a by $\beta$ is an integer. Wavelength arrangements of such cases are shown in FIGS. 14A to 14C. FIGS. 14A to 14C show cases where $\alpha/\beta=2$ and N is changed to 4, 5, and 6. FIG. 14A is a diagram showing an example of the case where $\alpha/\beta=2$ and N is changed to 4. FIG. 14B is a diagram showing an example of the case where $\alpha/\beta=2$ and N is changed to 5. FIG. 14C is a diagram showing an example of the case where $\alpha/\beta=2$ and N is changed to 6.

In these cases, it is possible to receive optical signals in both of the bands $\beta_-'$ and $\beta_+'$ as described above. However, if N is small, there is a region between the two bands $\beta_-'$ and $\beta_+'$ in which signals cannot be received as shown in FIG. 14A, for example. Wavelength variation that occurs due to a temperature change or the like in the transmitter 10 is usually continuous, and accordingly, frequency variation that is to be allowed is also continuous. Therefore, in a case where N is small (N<$(2\alpha+\beta)/\beta$), the range of frequency variation allowed for the transmitter 10 is only $\beta_-'$ or $\beta_+'$.

On the other hand, in a case where N=$(2\alpha+\beta)/\beta$, the bands $\beta_-'$ and $\beta_+'$ are continuous to each other, and accordingly, the range of allowable variation is a frequency band obtained by combining $\beta_-'$ and $\beta_+'$. If N is further increased, the frequency band of allowable frequency variation increases by $\beta$ as N is increased by one. As described above, the range of frequency variation allowed for the transmitter 10 with respect to the number of local lights is expressed by the following Expressions (1) to (3) according to conditions of $B_{total}$.

[Math. 1]
$$B_{total} = \beta N \left( N < \frac{2\alpha + \beta}{\beta} \right) \quad \text{Expression (1)}$$

[Math. 2]
$$B_{total} = 2\alpha + \beta + \beta N \left( N > \frac{2\alpha + \beta}{\beta} \right) \quad \text{Expression (2)}$$

[Math. 3]
$$B_{total} = 2\beta N \left( N = \frac{2\alpha + \beta}{\beta} \right) \quad \text{Expression (3)}$$

According to the second embodiment configured as described above, an optical signal can be received similarly to the first embodiment even in a method in which an optical signal cannot be received if the frequency offset is 0. Specifically, in the second embodiment, in a method in which a signal light cannot be received if the frequency offset is 0, with respect to local lights in the wavelength selection unit 232 and wavelength arrangement of the wavelength multiplexer/demultiplexer 221 in the wavelength detection unit 22, a band $\beta$ is set such that $\alpha/\beta$ is an integer, where $\alpha$ represents a band from a local light to a signal reception band and $\beta$ represents the signal reception band. Thus, the range of frequency variation allowed for the transmitter 10 with respect to the number of local lights is increased. Therefore, an optical signal can be received similarly to the first embodiment even in the method in which an optical signal cannot be received if the frequency offset is 0.

Third Embodiment

In the first and second embodiments, a configuration in which optical signals generated by the local light generation unit are selected using the optical SWs in the wavelength selection unit has been described. In a third embodiment, a configuration in which SW signals are transmitted to driver circuits that drive LDs for respective local lights that are used in selection, and ON and OFF of the local lights are controlled by controlling currents flowing to the LDs will be described.

Figure 15:
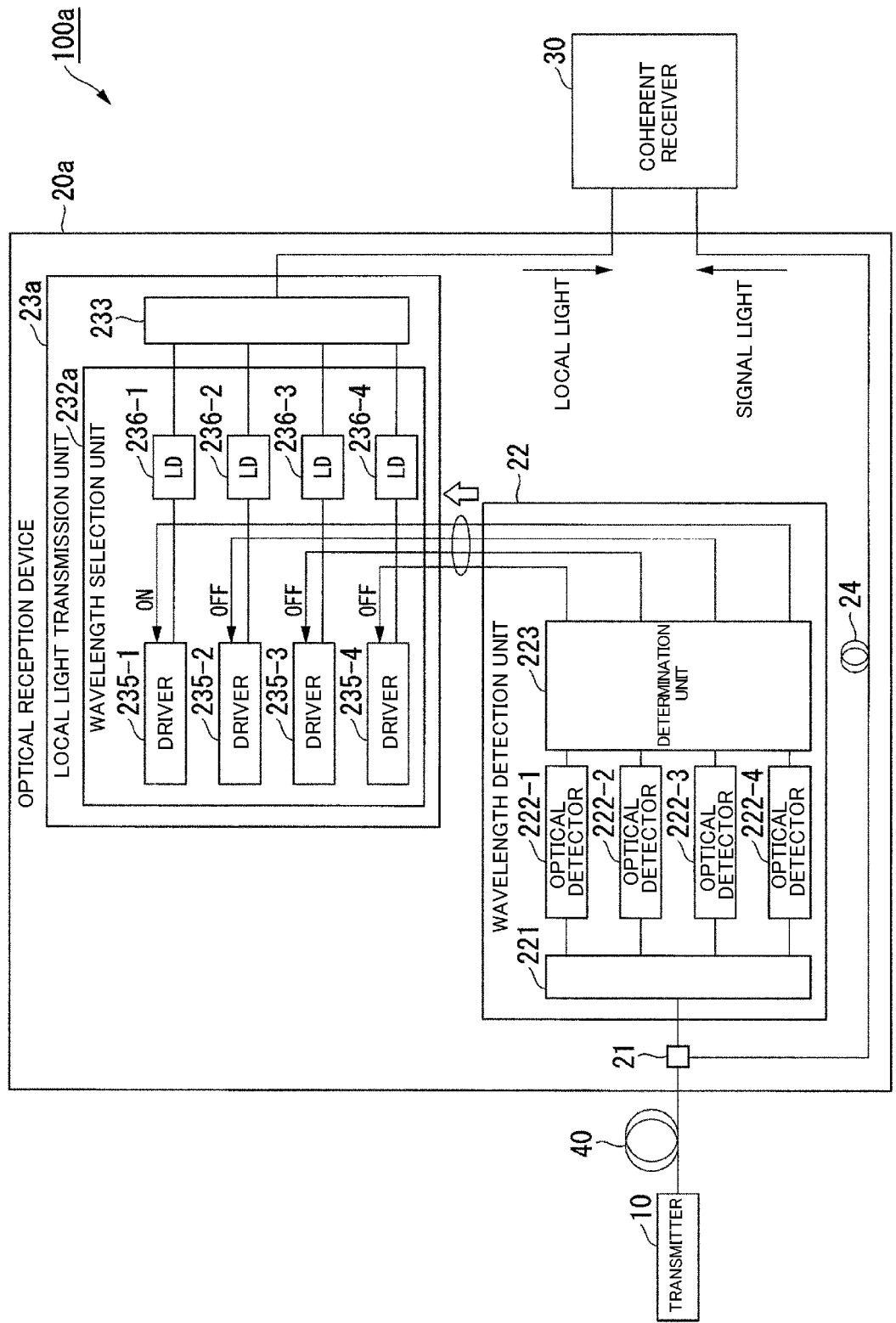
FIG. 15 is a system configuration diagram showing a system configuration of an optical transmission system according to a third embodiment.

FIG. 15 is a system configuration diagram showing a system configuration of an optical transmission system 100a in the third embodiment. The optical transmission system 100a includes the transmitter 10, an optical reception device 20a, and the coherent receiver 30. The system configuration in the second embodiment is similar to that in the first and second embodiments except for the configuration of the optical reception device 20a. Therefore, the following describes the configuration of the optical reception device 20a.

The optical reception device 20a includes the optical splitter 21, the wavelength detection unit 22, a local light transmission unit 23a, and the delay fiber 24. In the optical reception device 20a, the configuration of the local light transmission unit 23a differs from that in the first and second embodiments. Therefore, the configuration of the local light transmission unit 23a will be described.

The local light transmission unit 23a is constituted by a wavelength selection unit 232a and the wavelength multiplexer/demultiplexer 233. The wavelength selection unit 232a is constituted by a plurality of drivers 235-1 to 235-4 and LDs 236-1 to 236-4.

The drivers 235-1 to 235-4 drive the LDs 236-1 to 236-4. Specifically, if an ON signal is input from the determination unit 223, the drivers 235-1 to 235-4 each control a current flowing to a corresponding one of the LDs 236-1 to 236-4 to cause the LD to output a local light. On the other hand, if an OFF signal is input from the determination unit 223, the drivers 235-1 to 235-4 do not drive the LDs 236-1 to 236-4. That is, if an OFF signal is input from the determination unit 223, the drivers 235-1 to 235-4 each stop supplying a current to the corresponding one of the LDs 236-1 to 236-4 and do not drive the LD.

The LDs 236-1 to 236-4 output local lights under control performed by the drivers 235-1 to 235-4. The LDs 236-1 to 236-4 respectively output local lights having different wavelengths. For example, the LD 236-1 generates a local light having the wavelength and outputs the generated local light. The LD 236-2 generates a local light having the wavelength 22 and outputs the generated local light. The LD 236-3 generates a local light having the wavelength 23 and outputs the generated local light. The LD 236-4 generates a local light having the wavelength 24 and outputs the generated local light.

According to the optical transmission system 100a configured as described above, effects similar to those achieved in the first and second embodiments can be achieved.

Variations common to the first to third embodiments will be described. Each of the optical reception devices 20 and 20a may also be configured to constitute a single unit together with the coherent receiver 30.

The optical reception devices 20 and 20a in the above embodiments may also be realized using a computer. In this case, the optical reception devices may also be realized by recording a program for realizing the functions in a computer-readable recording medium and causing a computer system to read and execute the program recorded in the recording medium. Note that the "computer system" referred to here includes an OS and hardware such as peripherals.

Also, the "computer-readable recording medium" refers to a portable medium such as a flexible disk, a magneto-optical disk, a ROM, or a CD-ROM, or a storage device built in the computer system, such as a hard disk. Furthermore, examples of the "computer-readable recording medium" include a medium that dynamically holds the program for a short period of time, like a communication line when transmitting the program through a network such as the Internet or a communication line such as a telephone line, and a medium that holds the program for a certain period of time like a volatile memory in a computer system that serves as a server or a client in that case. Also, the above-described program may be a program for realizing some of the aforementioned functions, a program that can realize the aforementioned functions in combination with a program that has already been recorded in the computer system, or a program that is realized using a programmable logic device such as a FPGA (Field Programmable Gate Array).

Although the embodiments of the present invention have been described in detail with reference to the drawings, specific configurations are not limited to these embodiments, and design or the like made without departing from gist of the present invention is also included in the scope of the present invention.

INDUSTRIAL APPLICABILITY

The present invention can be applied to an optical transmission system.

REFERENCE SIGNS LIST

10 Transmitter
20, 20a Optical reception device
30 Coherent receiver
21 Optical splitter
22 Wavelength detection unit
23, 23a Local light transmission unit
24 Delay fiber
221 Wavelength multiplexer/demultiplexer
222-1 to 222-4 Optical detector
223 Determination unit
224 Threshold setting unit
225-1 to 225-4 Comparator
226 Low-voltage output unit
227-1 to 227-4 Logic circuit
228-1 to 228-4 Voltage adjuster
231 Local light generation unit
232 Wavelength selection unit
233 Wavelength multiplexer/demultiplexer
234-1 to 234-4 Optical SW
235-1 to 235-4 Driver
236-1 to 236-4 LD

The invention claimed is:

1. An optical reception device comprising:
a local light transmission unit configured to generate a plurality of local lights having different wavelengths, select, from among the plurality of generated local lights having different wavelengths, a local light having a wavelength that is closest to the wavelength of a received optical signal, and transmit the selected local light to a coherent receiver;
an optical splitter configured to receive the received optical signal and transmit the received optical signal to the coherent receiver via a first path; and
a wavelength detection unit configured to receive the received optical signal from the optical splitter via a second path, split the received optical signal into different paths according to wavelengths by using a wavelength multiplexer/demultiplexer, and output, to the local light transmission unit, a control signal for causing the local light transmission unit to output a local light having a frequency that corresponds to a path in which the optical signal is included.

2. The optical reception device according to claim 1, wherein the wavelength detection unit detects a path along which the optical signal entered by monitoring optical intensity with respect to each wavelength and comparing the optical intensity with a threshold value, and outputs, to the local light transmission unit, a control signal for causing the local light transmission unit to output a local light having a frequency that is associated with the detected path.

3. The optical reception device according to claim 2, wherein the wavelength detection unit includes a logic circuit for determining one path from adjacent paths if an optical signal is detected for each of the adjacent paths, and
the logic circuit includes a plurality of input units and an output unit and outputs a signal for causing the local light to be output if a first signal and a second signal are input to the plurality of input units, the first signal indicating that the optical intensity is lower than the threshold value, the second signal indicating that the optical intensity is at least the threshold value.

4. The optical reception device according to claim 1, wherein a wavelength range of receivable signal lights of each local light generated by the local light transmission unit includes a pass range of any one of the paths of the wavelength multiplexer/demultiplexer in the wavelength detection unit, and the local lights and the paths in the wavelength detection unit are associated with each other in one-to-one correspondence.

5. The optical reception device according to claim 1, wherein, in a method in which a signal light cannot be received if a frequency offset is 0, with respect to the local lights and wavelength arrangement of the wavelength multiplexer/demultiplexer, a band $\beta$ is set such that $\alpha/\beta$ is an integer, $\alpha$ representing a band from a local light to a signal reception band, $\beta$ representing the signal reception band.

6. An optical transmission system comprising:
an optical transmitter configured to transmit an optical signal; and
an optical reception device configured to receive an optical signal transmitted from the optical transmitter, wherein the optical reception device includes:
a local light transmission unit configured to generate a plurality of local lights having different wavelengths, select, from among the plurality of generated local lights having different wavelengths, a local light having a wavelength that is closest to the wavelength of a received optical signal, and transmit the selected local light to a coherent receiver;
an optical splitter configured to receive the received optical signal and transmit the received optical signal to the coherent receiver via a first path; and
a wavelength detection unit configured to receive the received optical signal from the optical splitter via a second path, split the received optical signal into different paths according to wavelengths by using a wavelength multiplexer/demultiplexer, and output, to the local light transmission unit, a control signal for causing the local light transmission unit to output a local light having a frequency that corresponds to a path in which the optical signal is included.

7. The optical transmission system according to claim 6, wherein the wavelength detection unit detects a path along which the optical signal entered by monitoring optical intensity with respect to each wavelength and comparing the optical intensity with a threshold value, and outputs, to the local light transmission unit, a control signal for causing the local light transmission unit to output a local light having a frequency that is associated with the detected path.

8. The optical transmission system according to claim 7 wherein the wavelength detection unit includes a logic circuit for determining one path from adjacent paths if an optical signal is detected for each of the adjacent paths, and the logic circuit includes a plurality of input units and an output unit and outputs a signal for causing the local light to be output if a first signal and a second signal are input to the plurality of input units, the first signal indicating that the optical intensity is lower than the threshold value, the second signal indicating that the optical intensity is at least the threshold value.

9. The optical transmission system according to claim 6 wherein a wavelength range of receivable signal lights of each local light generated by the local light transmission unit includes a pass range of any one of the paths of the wavelength multiplexer/demultiplexer in the wavelength detection unit, and the local lights and the paths in the wavelength detection unit are associated with each other in one-to-one correspondence.

10. The optical transmission system according to claim 6 wherein, in a method in which a signal light cannot be received if a frequency offset is 0, with respect to the local lights and wavelength arrangement of the wavelength multiplexer/demultiplexer, a band $\beta$ is set such that $\alpha/\beta$ is an integer, a representing a band from a local light to a signal reception band, $\beta$ representing the signal reception band.

11. An optical transmission method comprising:
a local light transmission step of generating a plurality of local lights having different wavelengths, selecting, from among the plurality of generated local lights having different wavelengths, a local light having a wavelength that is closest to the wavelength of a received optical signal, and transmitting the selected local light to a coherent receiver;
a splitting step of splitting the received optical signal and transmitting the received optical signal to the coherent receiver via a first path; and
a transmission step of receiving the received optical signal via a second path, splitting the received optical signal into different paths according to wavelengths by using a wavelength multiplexer/demultiplexer, and causing a local light to be transmitted in the local light transmission step, the local light having a frequency that corresponds to a path in which the optical signal is included.

* * * * *